(12) United States Patent
Wang

(10) Patent No.: US 10,365,051 B2
(45) Date of Patent: Jul. 30, 2019

(54) MICROCHANNEL HEAT EXCHANGER

(71) Applicant: FUJITSU GENERAL LIMITED, Kanagawa (JP)

(72) Inventor: Kaijian Wang, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 15/758,542

(22) PCT Filed: Aug. 19, 2016

(86) PCT No.: PCT/JP2016/074189
§ 371 (c)(1),
(2) Date: Mar. 8, 2018

(87) PCT Pub. No.: WO2017/043286
PCT Pub. Date: Mar. 16, 2017

(65) Prior Publication Data
US 2018/0259273 A1 Sep. 13, 2018

(30) Foreign Application Priority Data

Sep. 9, 2015 (JP) .................................. 2015-177800

(51) Int. Cl.
*F28F 27/00* (2006.01)
*F28F 3/04* (2006.01)
(Continued)

(52) U.S. Cl.
CPC .............. *F28F 27/00* (2013.01); *F25B 49/02* (2013.01); *F28D 9/0037* (2013.01);
(Continued)

(58) Field of Classification Search
CPC .... F28D 9/0037; F28D 9/0043; F28D 9/0081; F28F 2265/14; F24F 11/41; F24F 11/523
(Continued)

(56) References Cited

U.S. PATENT DOCUMENTS 4,449,574 A * 5/1984 Yoshino ................ F24F 12/001
165/11.1
4,503,908 A * 3/1985 Rosman ................ F28D 9/0018
165/167
(Continued)

FOREIGN PATENT DOCUMENTS

JP 60253795 A * 12/1985 ............... F28D 9/00
JP 2013-178014 A 9/2013
(Continued)

OTHER PUBLICATIONS

Nov. 8, 2016, International Search Report issued for related PCT application No. PCT/JP2016/074189.
(Continued)

*Primary Examiner* — Allen J Flanigan
(74) *Attorney, Agent, or Firm* — Paratus Law Group, PLLC

(57) ABSTRACT

This microchannel heat exchanger includes: a heat exchanger body including a channel layer stack formed in such a manner that a plurality of high-temperature channel layers provided with a channel for a high-temperature fluid and a plurality of low-temperature channels layers provided with a channel for a low-temperature fluid are alternately stacked, an inlet and an outlet for the high-temperature fluid, and an inlet and an outlet for the low-temperature fluid; and a control board that is fixed in a stacking direction of the heat exchanger body, and that at least installs a plurality of temperature sensors that are inserted in the stacking method of the heat exchanger body in such a manner that a sensing point is arranged near each of the inlet and the outlet for the high-temperature fluid and the inlet and the outlet for the low-temperature fluid.

5 Claims, 13 Drawing Sheets

(51) Int. Cl.

| | |
|---|---|
| *F25B 49/02* | (2006.01) |
| *G01K 1/14* | (2006.01) |
| *G01K 13/02* | (2006.01) |
| *F28D 9/00* | (2006.01) |
| *F28F 3/08* | (2006.01) |
| *G01K 1/02* | (2006.01) |
| *F28F 9/02* | (2006.01) |
| *F28F 13/08* | (2006.01) |
| *F28F 13/12* | (2006.01) |
| *F28D 21/00* | (2006.01) |

(52) U.S. Cl.
CPC ............. *F28D 9/0062* (2013.01); *F28F 3/04* (2013.01); *F28F 3/086* (2013.01); *F28F 9/028* (2013.01); *F28F 9/0263* (2013.01); *F28F 9/0282* (2013.01); *F28F 13/08* (2013.01); *F28F 13/12* (2013.01); *G01K 1/024* (2013.01); *G01K 1/14* (2013.01); *G01K 13/02* (2013.01); *F28D 2021/0029* (2013.01); *F28F 2260/02* (2013.01)

(58) Field of Classification Search
USPC .................................. 165/11.1, 288, 292, 293
See application file for complete search history.

(56) References Cited

U.S. PATENT DOCUMENTS

| | | | | |
|---|---|---|---|---|
| 4,574,870 | A * | 3/1986 | Weitman | F28D 21/0012 165/292 |
| 6,175,688 | B1 * | 1/2001 | Cassidy | A61M 5/365 392/470 |
| 6,537,506 | B1 * | 3/2003 | Schwalbe | B01F 5/0604 422/129 |
| 9,211,381 | B2 * | 12/2015 | Faries | A61M 5/44 |
| 2008/0087027 | A1 * | 4/2008 | Park | F01C 21/02 62/81 |
| 2008/0190594 | A1 * | 8/2008 | Dahlbeck | B01D 1/221 165/167 |
| 2012/0168112 | A1 * | 7/2012 | Scott | F28D 9/005 165/11.1 |
| 2015/0122467 | A1 * | 5/2015 | Shi | F28F 3/048 165/166 |

FOREIGN PATENT DOCUMENTS

| | | |
|---|---|---|
| JP | 2015-158315 A | 9/2015 |
| JP | 2015-190705 A | 11/2015 |

OTHER PUBLICATIONS

The Japan Society of Mechanical Engineers, 2013 determined Japan Society of Mechanical Engineers Award Excellence Product Award!, Mar. 3, 2014, p. 1.

* cited by examiner

| High-temperature inlet temperature | ○○ °C |
|---|---|
| High-temperature outlet temperature | △△ °C |
| Low-temperature inlet temperature | □□ °C |
| Low-temperature outlet temperature | ×× °C |

FIG.12

MICROCHANNEL HEAT EXCHANGER

CROSS REFERENCE TO PRIOR APPLICATION

This application is a National Stage Patent Application of PCT International Patent Application No. PCT/JP2016/074189 (filed on Aug. 19, 2016) under 35 U.S.C. § 371, which claims priority to Japanese Patent Application No. 2015-177800 (filed on Sep. 9, 2015), which are all hereby incorporated by reference in their entirety.

TECHNICAL FIELD

The present invention relates to a microchannel heat exchanger configured by stacking a plurality of heat transfer plates in which channels for a working fluid for heat exchange are formed.

BACKGROUND ART

A heat exchanger is used as one element of a refrigeration cycle. The heat exchanger is an essential part for changing a temperature of a working fluid in the refrigeration cycle to a desired temperature. Various heat exchangers exist. In particular, microchannel heat exchangers have excellent performance, which is becoming more and more known. The microchannel heat exchangers are being developed for practical application.

Those microchannel heat exchangers include a stacked microchannel heat exchanger. This stacked microchannel heat exchanger is configured as follows, for example. A stack is formed by alternately stacking heat transfer plates having surfaces in which minute high-temperature channels are formed and heat transfer plates having surfaces in which minute low-temperature channels are formed. Pressure-resistant metal plates are disposed on an upper surface and a bottom surface of the stack, and pressed and heated in a vacuum state. In this manner, the heat transfer plates and the metal plates are diffusion-welded and integrated with one another (e.g., Non-Patent Literature 1).

Structural characteristics of the stacked microchannel heat exchanger as compared to a plate-type heat exchanger can include capability of forming a larger number of channels in each layer, capability of forming short channels, and the like. With this, the stacked microchannel heat exchanger can be downsized in comparison with the plate-type heat exchanger.

Further, the stacked microchannel heat exchanger has more excellent points also in view of heat transfer property, coolant filling amount, higher pressure-resistance, and heat-resistance in comparison with conventional heat exchangers. For example, the coefficient of overall heat transmission between working fluids via a heat transfer surface (plate) is large, the channel shape loss is low, the channel area can be reduced if the flow loss is equal to that of the plate-type heat exchanger, the pressure loss of compressed working fluids can be reduced, the amount of working fluid filling the refrigeration cycle can be reduced due to the reduced volume of the entire heat exchanger, etc.

The outlet and inlet of the stacked microchannel heat exchanger which working fluids exits and enters are provided with temperature sensors. The temperature sensors are provided for the purpose of calculating a quantity of heat exchanged in the heat exchanger on the basis of temperatures measured by the temperature sensors and controlling a flowing-out working fluid to a desired temperature.

For accomplishing this purpose, the temperature sensors need to be capable of correctly measuring temperatures of working fluids. For example, in a case where heat is exchanged between two working fluids, the heat exchange capability (amount of heat transferred) of the heat exchanger can be calculated on the basis of a temperature difference between a flowing-in working fluid and a flowing-out working fluid in accordance with the following expression.

$$Q([J/s] = [W]) = c_{p,l} ([J/kgK]) \times G_l ([kg/s]) \times (T_{Low,out} - T_{Low,in}) ([K]) =$$
$$c_{p,h} ([J/kgK]) \times G_h ([kg/s]) \times (T_{High,in} - T_{High,out}) ([K])$$

Q: amount of heat transferred [J/s]=[W]

$c_{p,\,l}$: specific heat [J/kgK] of low-temperature working fluid $c_{p,\,h}$: specific heat [J/kgK] of high-temperature working fluid $G_l$: mass flow rate [kg/s] of low-temperature working fluid $G_h$: mass flow rate [kg/s] of high-temperature working fluid $(T_{Low,\,out} - T_{Low,\,in})$: (temperature difference [K] between heat-exchanger outlet temperature of low-temperature working fluid and inlet temperature of low-temperature working fluid)

$(T_{High,\,in} - T_{High,\,out})$: (temperature difference [K] between heat-exchanger inlet temperature of high-temperature working fluid and outlet temperature of low-temperature working fluid)

Further, with a water heater or the like, it is necessary to correctly measure a temperature of a working fluid flowing through an outlet of a microchannel heat exchanger for checking whether or not the working fluid has reached a desired temperature. Further, it is necessary to correctly measure a temperature of the working fluid flowing through an inlet of the microchannel heat exchanger for checking whether or not it is necessary to heat a working fluid flowing out of a hot water tank and also for deriving a quantity of heat required for heating the working fluid to a desired temperature.

For measuring the temperatures of the working fluids flowing through the outlet and inlet of the stacked microchannel heat exchanger, temperature sensors such as thermocouples are used.

Thermoelectromotive force measured at a sensing point of each temperature sensor is transmitted to a thermoelectromotive force-to-temperature conversion circuit via a thermocouple wire continuous with the sensing point. In many cases, the temperature sensor is fixed to an outer surface of a pipe, which is attached to each of the inlet and the outlet for the working fluid of the heat exchanger, by soldering. In this case, the sensing point of the temperature sensor is not in direct contact with the working fluid, and hence it is impossible to correctly measure the temperature of the working fluid.

Therefore, the measured temperature has an error 1 due to heat conduction of the metal forming the heat exchanger, an error 2 due to a temperature difference between a temperature of a position at which the temperature sensor is attached and an actual temperature of the working fluid flowing through the outlet/inlet, an error 3 due to a temperature difference between a temperature of the working fluid flowing near a center of the pipe and a temperature of the working fluid flowing near a wall surface of the pipe due to a temperature boundary layer of the working fluid flowing through outlet/inlet pipe connected to the outlet/inlet, a measurement error 4 of a measurement method of the temperature sensor, and the like.

CITATION LIST

Non-Patent Literature

Non-Patent Literature 1: Japan Society of Mechanical Engineers awards 2013

DISCLOSURE OF INVENTION

Technical Problem

The plate-type heat exchanger has an outside dimension of, for example, 95 (width)×325 (length)×81.96 (height) (mm). That is, the plate-type heat exchanger is larger than the outside dimension (80 (width)×106 (length)×43.2 (height) (mm)) of the stacked microchannel heat exchanger having the same heat exchange capability as this plate-type heat exchanger. Thus, the surface area of the plate-type heat exchanger, which is in contact with the surrounding air, is larger. Therefore, the plate-type heat exchanger is susceptible to disturbance. Specifically, in this disturbance, heat in the air moves into the plate-type heat exchanger and heat inside the plate-type heat exchanger moves to the air, for example. Therefore, it is difficult to measure the actual temperature of the working fluid without influence from other factors such as disturbance.

On the other hand, the surface area of the stacked microchannel heat exchanger, which is in contact with the surrounding air, is smaller. Therefore, disturbance, for example, heat movement from the air into the heat exchanger body and heat movement from the inside of the heat exchanger body to the air is reduced in the stacked microchannel heat exchanger. Thus, it is easier for the stacked microchannel heat exchanger to measure the actual temperature of the working fluid in comparison with the plate-type heat exchanger. If it is possible to measure the actual temperature of the working fluid, a stacked microchannel heat exchanger used in an air conditioner, a floor heating system, or the like does not need to consume unnecessary energy for temperature adjustment based on measurement errors when the temperature of the air in a room is adjusted to a set temperature.

However, in the actual stacked microchannel heat exchanger used in the air conditioner, the floor heating system, or the like, the temperature of the working fluid flowing through the outlet/inlet of the heat exchanger body is not directly measured and the surface temperature of the pipe connected to the outlet/inlet of the heat exchanger body is measured as described above. For example, in a case of the microchannel heat exchanger used in the floor heating system or the like, although the temperature of the working fluid (e.g., water) flowing through the inlet is a low temperature, the surface temperature of the pipe which is connected to the inlet and through which the working fluid flows may be measured as being higher than the actual temperature of the working fluid as the result of heat movement to the pipe from the air due to heat conduction of the metal surface. Further, although the temperature of the working fluid flowing through the outlet is a high temperature, the surface temperature of the pipe which is connected to the outlet and through which the working fluid flows may be measured as being lower than the actual temperature of the working fluid as the result of heat movement to the air due to heat conduction of the metal surface. These are the errors due to mounting positions of the temperature sensors (above-mentioned errors 1 to 3).

Further, the stacked microchannel heat exchanger is small, and hence heat is transferred between the outlet pipe and the inlet pipe due to heat conduction of the heat exchanger body. Thus, in some cases, the temperature of one of the outlet pipe and the inlet pipe, which has a lower temperature, is measured as a higher temperature, and the temperature of the other which has a higher temperature is measured as a lower temperature.

As described above, the actual temperatures of the working fluids cannot to measured in accordance with the method for measuring the temperatures of the working fluids by the use of the temperature sensors mounted on the surfaces of the pipes connected to the outlet and inlet of the stacked microchannel heat exchanger.

In view of this, in order to measure actual temperatures of the working fluids flowing through the outlet and inlet of the heat exchanger body, the following method has been considered. This method is a method of directly measuring the temperatures of the working fluids flowing through the outlet and inlet of the heat exchanger body by inserting the sensing points of the temperature sensors (temperature-measuring junctions of thermocouple) into the pipes of the outlet and inlet of the heat exchanger body, to thereby allow the working fluids flowing within the pipes to be in direct contact with the sensing points of the temperature sensors.

However, for transmitting detected signals of the temperature sensors to a printed board that is a control board that is provided separately from the heat exchanger and processes signals detected by the sensors, each of the plurality of temperature sensors and the printed board need to be individually connected with lead wires. The work of connecting these lead wires is time-consuming.

In view of the above-mentioned circumstances, it is an object of the present invention to provide a heat exchanger capable of facilitating the work of connecting the temperature sensors that directly measure the temperatures of the working fluids in contact with the working fluid and the control board with the lead wires.

Solution to Problem

In order to accomplish the above-mentioned object, a heat exchanger according to an embodiment of the present invention includes: a heat exchanger body including a channel layer stack formed in such a manner that a plurality of high-temperature channel layers provided with a channel for a high-temperature fluid and a plurality of low-temperature channels layers provided with a channel for a low-temperature fluid are alternately stacked, an inlet and an outlet for the high-temperature fluid, and an inlet and an outlet for the low-temperature fluid; and a printed board that is fixed in a stacking direction of the heat exchanger body, and that at least installs a plurality of temperature sensors that are inserted in the stacking direction of the heat exchanger body in such a manner that a sensing point is arranged near each of the inlet and the outlet for the high-temperature fluid and the inlet and the outlet for the low-temperature fluid.

Further, in the heat exchanger according to the present invention, a display device that displays temperature data may be installed in the printed board.

In addition, in the heat exchanger according to the present invention, a transmission device that wiredly or wirelessly sends temperature data to an external device may be installed in the printed board.

In addition, the heat exchanger according to the present invention may further include a heater in the printed board, the heater being arranged near the channel for the low-temperature fluid of the heat exchanger body.

Advantageous Effects of Invention

In accordance with the present invention, it is possible to facilitate the work of connecting the temperature sensors that directly measure the temperatures of the working fluids in contact with the working fluid and the control board with the lead wires.

BRIEF DESCRIPTION OF DRAWINGS

FIG. 12 A diagram showing a display form of temperature data in the microchannel heat exchanger of FIG. 1.

MODE(S) FOR CARRYING OUT THE INVENTION

Hereinafter, an embodiment of the present invention will be described with reference to the drawings.

Figure 1:
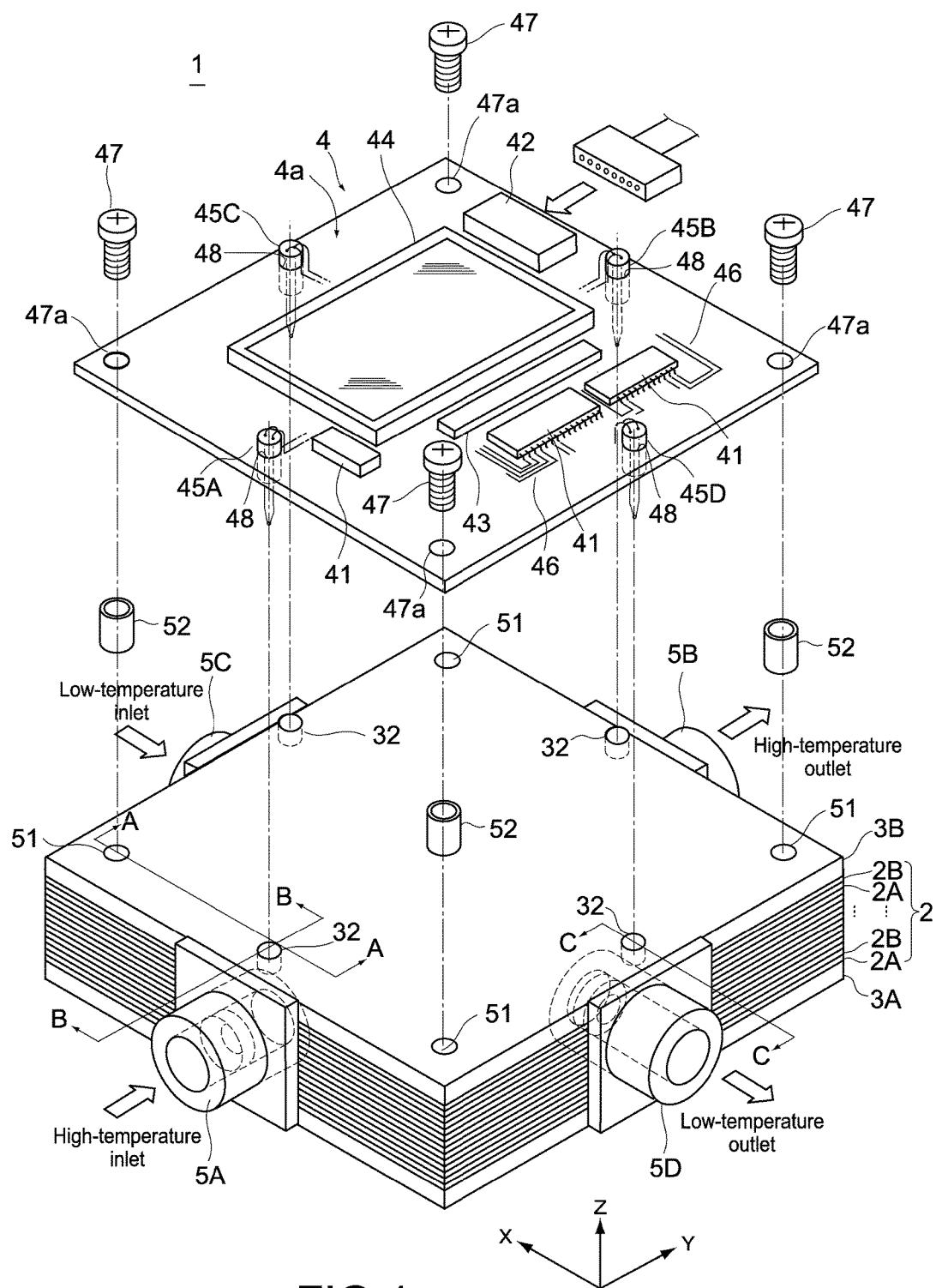
FIG. 1 A perspective view showing a microchannel heat exchanger according to an embodiment of the present invention.
Figure 2:
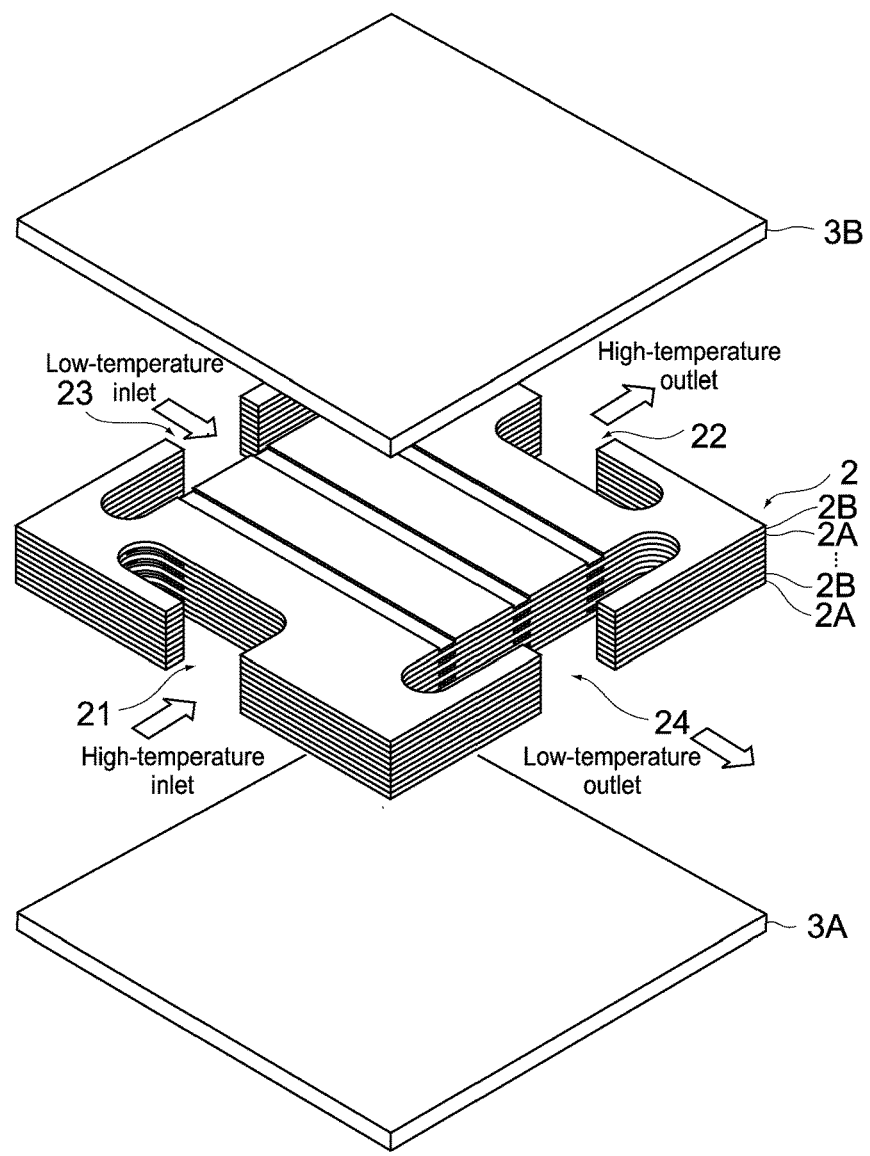
FIG. 2 A perspective view showing the microchannel heat exchanger of FIG. 1 in a partially exploded state.

FIG. 1 is a perspective view showing a microchannel heat exchanger according to a first embodiment of the present invention with a printed board that is a control board being detached. FIG. 2 is a perspective view showing a heat exchanger body of the microchannel heat exchanger of FIG. 1 in a partially exploded state.

[Entire Configuration]

As shown in those figures, this microchannel heat exchanger 1 includes a heat exchanger body 2 that is a stack of channel layers, a high-temperature-side outer case plate 3A, a low-temperature-side outer case plate 3B, a high-temperature inlet pipe 5A that allows a high-temperature fluid to flow in, a high-temperature outlet pipe 5B that allows the high-temperature fluid to flow out, a low-temperature inlet pipe 5C that allows a low-temperature fluid to flow in, a low-temperature outlet pipe 5D that allows the low-temperature fluid to flow out, and a printed board 4. Note that, hereinafter, the high-temperature inlet pipe 5A, the high-temperature outlet pipe 5B, the low-temperature inlet pipe 5C, and the low-temperature outlet pipe 5D will be collectively referred to as outlet/inlet pipes.

A surface of the heat exchanger body 2, which is in a direction opposite to a direction of an arrow of a Z-axis in the figure, will be referred to as a "surface on a high-temperature side" or a "lower surface". A surface of each member, which is in the direction of the arrow of the Z-axis, will be referred to as a "surface of a low-temperature side" or an "upper surface". The high-temperature-side outer case plate 3A is bonded to the surface on the high-temperature side of the heat exchanger body 2 is bonded and the low-temperature-side outer case plate 3B is bonded to the surface of the low-temperature side of the heat exchanger body 2.

The heat exchanger body 2 is formed by alternately stacking two types of heat transfer plates 2A, 2B each including a plurality of heat transfer plates. Configurations of the two types of heat transfer plates will be described later.

The two types of heat transfer plates 2A, 2B, the high-temperature-side outer case plate 3A, and the low-temperature-side outer case plate 3B that form the heat exchanger body 2 are formed of the same kind of metal plates having high heat conductivity, for example. More specifically, stainless steel or the like is used. These metal plates are stacked and then bonded to each other by diffusion welding to become an approximately rectangular paralleled-shaped stack. Note that the heat transfer plates 2A, 2B can have any plate thickness as long as the heat transfer plates 2A, 2B can form high-temperature channels or low-temperature channels and be diffusion-welded.

Hereinafter, surfaces of the microchannel heat exchanger 1, which are perpendicular to the Z-axis, will be referred to as "main surfaces" and four surfaces other than the main surfaces, which are perpendicular to the X-axis and the Y-axis, will be referred to as "side surfaces" in a manner that depends on needs for description.

As shown in FIG. 2, a high-temperature inlet header 21, a high-temperature outlet header 22, a low-temperature inlet header 23, and a low-temperature outlet header 24 are formed in the side surfaces of the microchannel heat exchanger 1, respectively. The high-temperature inlet header 21 allows a high-temperature fluid that is one of working fluids to flow into the high-temperature channels within the heat exchanger body 2. The high-temperature outlet header 22 allows the high-temperature fluid to flow out of the high-temperature channels within the heat exchanger body 2. The low-temperature inlet header 23 allows a low-temperature fluid that is another one of the working fluids to flow into the low-temperature channels within the heat exchanger body 2. The low-temperature outlet header 24 allows the low-temperature fluid to flow out of the low-temperature channels within the heat exchanger body 2.

As shown in FIG. 1, the high-temperature inlet pipe 5A is inserted into the high-temperature inlet header 21 from an outside and bonded to the heat exchanger body 2 by welding or the like. To an outer end portion of this high-temperature inlet pipe 5A, an outside pipe (not shown) for allowing the high-temperature fluid to flow in is detachably connected. The high-temperature outlet pipe 5B is inserted into the high-temperature outlet header 22 from the outside and bonded to the heat exchanger body 2 by welding or the like. To this high-temperature outlet pipe 5B, an outside pipe (not shown) for allowing the high-temperature fluid to flow out is detachably connected. The low-temperature inlet pipe 5C is inserted into the low-temperature inlet header 23 from the outside and bonded to the heat exchanger body 2 by welding or the like. To this low-temperature inlet pipe 5C, an outside pipe (not shown) for allowing the low-temperature fluid to flow in is detachably connected. The low-temperature outlet pipe 5D is inserted into the low-temperature outlet header 24 from the outside and bonded to the heat exchanger body 2 by welding or the like. To this low-temperature outlet pipe 5D, an outside pipe (not shown) for allowing the low-temperature fluid to flow out is detachably connected.

[Configuration of Heat Exchanger Body 2]

Next, a configuration of the heat exchanger body 2 will be described.

As described above, the heat exchanger body 2 is formed by alternately stacking two types of heat transfer plates 2A, 2B, each including a plurality of heat transfer plates. Channels and cutouts are formed in these heat transfer plates 2A, 2B by etching. The working fluids flowing into the channels are different between the heat transfer plates 2A, 2B. Therefore, the channels have different patterns. Meanwhile, the cutouts are formed to be header portions after the heat transfer plates 2A and 2B are stacked. Therefore, the cutouts have an identical shape. Note that processing for forming the channels and the cutouts in the heat transfer plates 2A and 2B includes not only etching but also laser beam machining, precision press processing, and cutting, for example. Further, edges of the channels may be formed by using an additive manufacturing technology such as a 3D printer.

Figure 3:
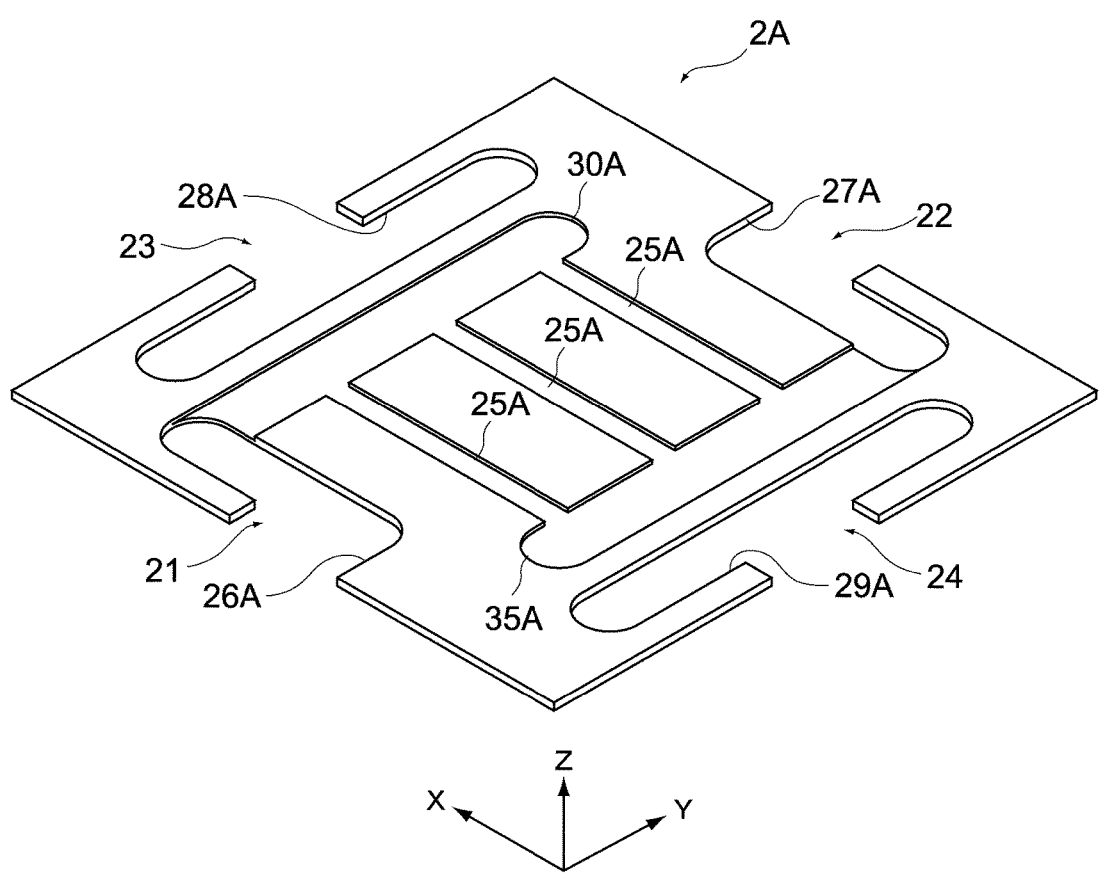
FIG. 3 A configuration of a perspective view showing a high-temperature heat transfer plate in the microchannel heat exchanger of FIG. 1.
Figure 4:
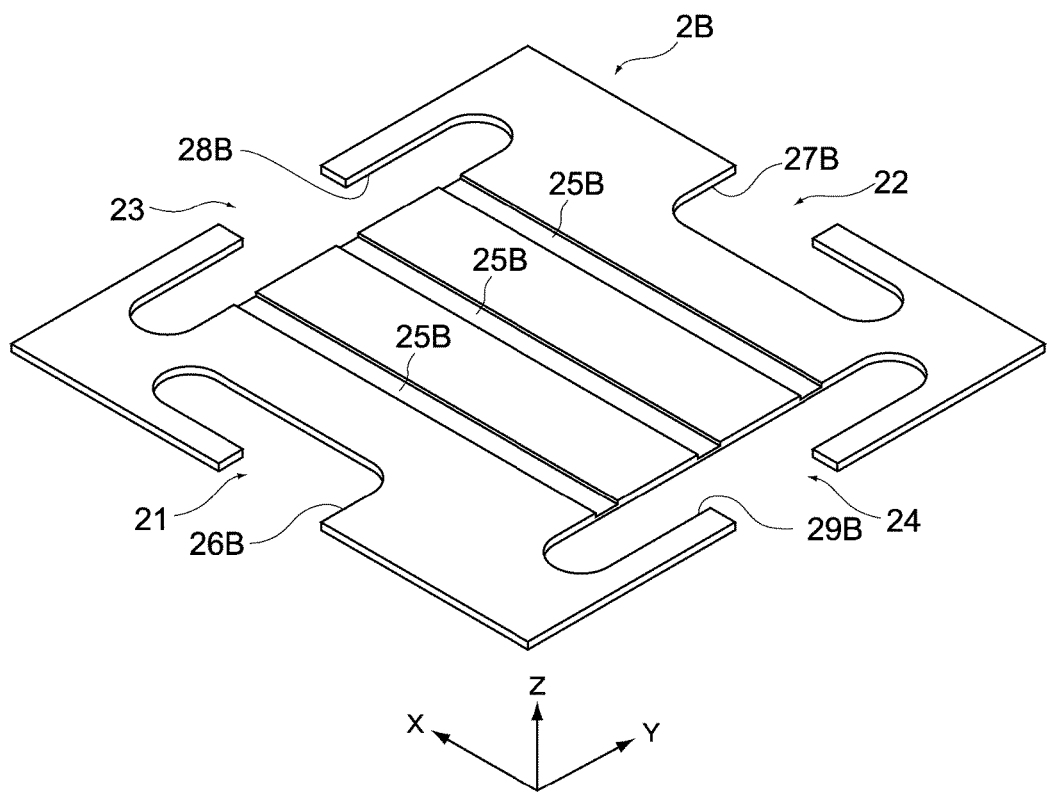
FIG. 4 A configuration of a perspective view showing a low-temperature heat transfer plate in the microchannel heat exchanger of FIG. 1.

FIGS. 3 and 4 are perspective views showing the two types of heat transfer plates 2A, 2B. Here, the heat transfer plate 2A shown in FIG. 3 is a "high-temperature heat transfer plate 2A", and the heat transfer plate 2B shown in FIG. 4 is a "low-temperature heat transfer plate 2B".

(Configuration of High-Temperature Heat Transfer Plate 2A)

As shown in FIG. 3, the high-temperature heat transfer plate 2A is provided with each of channels 25A, 30A, 31A and cutouts 26A, 27A, 28A, 29A that form channels of the high-temperature fluid. The channels 25A, 30A, 31A are provided only in one surface of the high-temperature heat transfer plate 2A. The depth of the channels 25A, 30A, 31A may be equal at any points. The cutouts 26A, 27A, 28A, 29A are formed by removing predetermined sites respectively corresponding to four sides of a base material of the high-temperature heat transfer plate 2A by an amount corresponding to the thickness of the base material.

Hereinafter, the cutouts 26A, 27A, 28A, 29A of the high-temperature heat transfer plate 2A will be respectively referred to as a first cutout 26A (high-temperature distribution portion), a second cutout 27A (high-temperature merging portion), a third cutout 28A, and a fourth cutout 29A in a manner that depends on needs for description.

The plurality of channels 25A, 30A, 31A that communicate between these first cutout 26A and second cutout 27A are formed in a region between the first cutout 26A and the second cutout 27A provided at both end portions of the high-temperature heat transfer plate 2A in a Y-axis direction in the figure. Note that, although the number of channels 25A is three in FIG. 3, a larger number of channels smaller in width may be formed.

Each of the above-mentioned channels 25A, 30A, 31A of the high-temperature heat transfer plate 2A includes the plurality of channels 25A formed along an X-axis direction and the two channels 30A, 31A formed along the Y-axis direction. The one channel 30A of the two channels 30A, 31A formed along the Y-axis direction communicates with the first cutout 26A at an end thereof. The other channel 31A communicates with the second cutout 27A at an end thereof. The plurality of channels 25A formed along the X-axis direction each communicate between the two channels 30A, 31A. With this, regarding a positional relationship between the high-temperature inlet header 21 and high-temperature outlet header 22 of the high-temperature heat transfer plate 2A and the low-temperature inlet header 23 and low-temperature outlet header 24 of the low-temperature heat transfer plate 2B, which are formed as will be described later, they are different from each other by 90 degrees.

(Configuration of Low-Temperature Heat Transfer Plate 2B)

As shown in FIG. 4, the low-temperature heat transfer plate 2B is provided with channels 25B and cutouts 26B, 27B, 28B, 29B that form channels of the low-temperature fluid. The channels 25B are provided only in one surface of the low-temperature heat transfer plate 2B. The depth of the channels 25B may be equal at any points. The cutouts 26B, 27B, 28B, 29B are formed by removing predetermined sites respectively corresponding to four sides of a base material of the low-temperature heat transfer plate 2B by an amount corresponding to the thickness of the base material.

Hereinafter, the cutouts 26B, 27B, 28B, 29B of the low-temperature heat transfer plate 2B will be respectively referred to as a fifth cutout 26B, a sixth cutout 27B, a seventh cutout 28B (low-temperature distribution portion), and an eighth cutout 29B (low-temperature merging portion) in a manner that depends on needs for description.

In a region between the seventh cutout 28B and the eighth cutout 29B provided at both end portions of the low-temperature heat transfer plate 2B in the X-axis direction in the figure, the plurality of channels 25B that communicate between these seventh cutout 28B and eighth cutout 29B are formed. The plurality of channels 25B are formed at the same positions in the Y-axis direction as the plurality of channels 25A formed in the high-temperature heat transfer plate 2A, respectively.

(Stacked Structure of High-Temperature Heat Transfer Plate 2A and Low-Temperature Heat Transfer Plate 2B)

Figure 5:
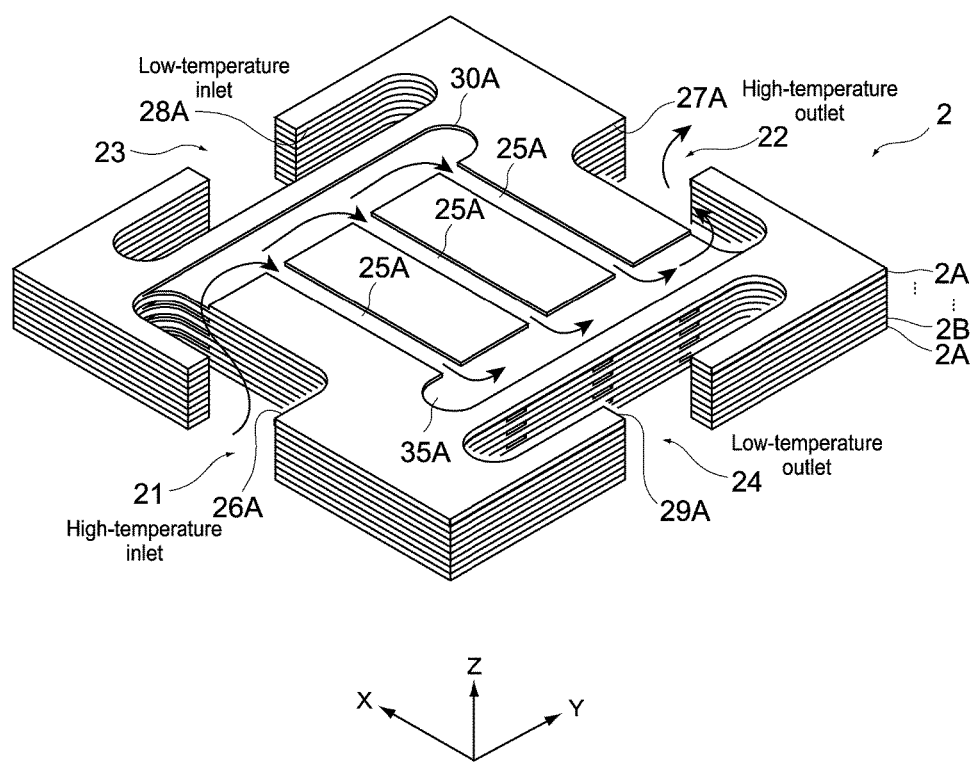
FIG. 5 A perspective view for describing high-temperature channels of a high-temperature channel layer in the microchannel heat exchanger of FIG. 1.
Figure 6:
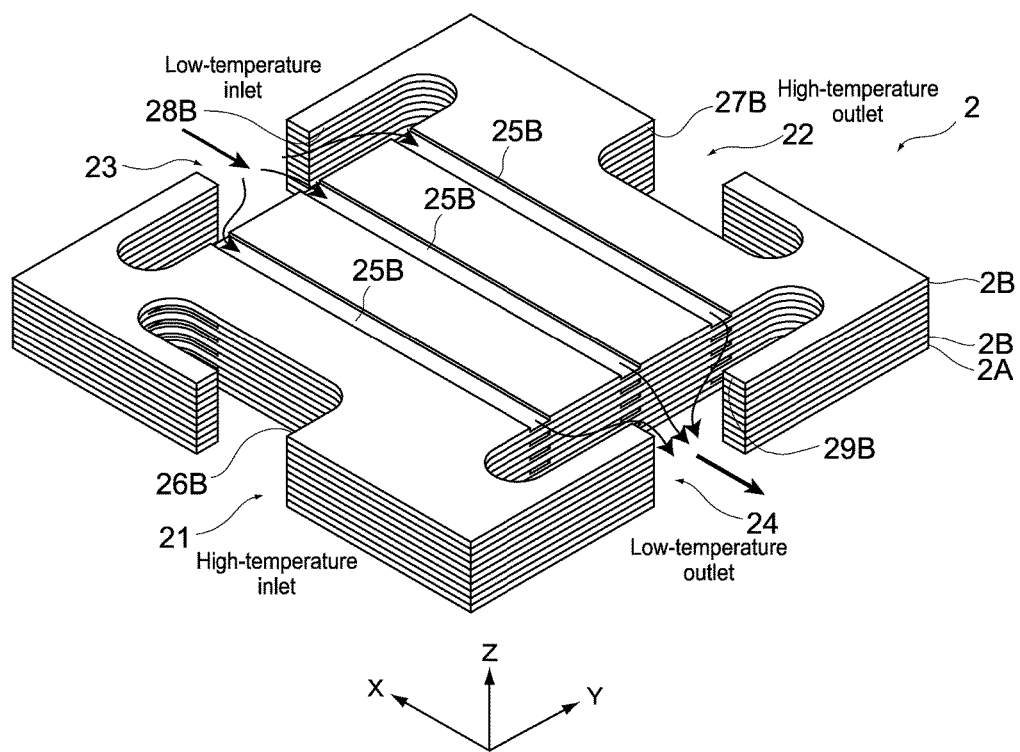
FIG. 6 A perspective view for describing low-temperature channels of a low-temperature channel layer in the microchannel heat exchanger of FIG. 1.

A plurality of high-temperature heat transfer plates 2A and a plurality of low-temperature heat transfer plates 2B having configurations as described above are alternately superimposed and stacked with the surfaces provided with the channels 25A, 25B, 30A, 31A of both are oriented in the same direction as shown in FIGS. 5 and 6. In this manner, the heat exchanger body 2 is formed.

In this heat exchanger body 2, the first cutout 26A of the high-temperature heat transfer plate 2A and the fifth cutout 26B of the low-temperature heat transfer plate 2B are form the high-temperature inlet header 21 in such a manner that the plurality of high-temperature heat transfer plates 2A and the plurality of low-temperature heat transfer plates 2B are alternately stacked.

The second cutout 27A of the high-temperature heat transfer plate 2A and the sixth cutout 27B of the low-temperature heat transfer plate 2B form the high-temperature outlet header 22 in such a manner that the plurality of high-temperature heat transfer plates 2A and the plurality of low-temperature heat transfer plates 2B are alternately stacked.

The third cutout 28A of the high-temperature heat transfer plate 2A and the seventh cutout 28B of the low-temperature heat transfer plate 2B form the low-temperature inlet header 23 in such a manner that the plurality of high-temperature heat transfer plates 2A and the plurality of low-temperature heat transfer plates 2B are alternately stacked.

The fourth cutout 29A of the high-temperature heat transfer plate 2A and the eighth cutout 29B of the low-temperature heat transfer plate 2B form the low-temperature outlet header 24 in such a manner that the plurality of high-temperature heat transfer plates 2A and the plurality of low-temperature heat transfer plates 2B are alternately stacked.

(Regarding High-Temperature Channels and Low-Temperature Channels)

FIG. 5 is a perspective view showing the high-temperature channels in the heat exchanger body 2.

The high-temperature channels are formed between the respective channels 25A, 30A, 31A of the high-temperature heat transfer plate 2A and a lower surface of the low-temperature heat transfer plate 2B. The high-temperature fluid flows in from the high-temperature inlet header 21 and is distributed into the plurality of channels 25A through the channel 30A. The high-temperature fluid passing through the plurality of channels 25A merges in the channel 31A, and flows out through the high-temperature outlet header 22. Such a flow of the high-temperature fluid occurs in a high-temperature channel layer corresponding to each of the high-temperature heat transfer plates 2A. Note that the high-temperature channel layer is formed by the respective channels 25A, 30A, 31A, the first cutout 26A, and the second cutout 27A of the high-temperature heat transfer plate 2A.

FIG. 6 is a perspective view showing the low-temperature channels in the heat exchanger body 2.

The low-temperature channels are formed between the channels 25B of the low-temperature heat transfer plate 2B and each of a lower surface of the low-temperature-side outer case plate 3B and a lower surface of the high-temperature heat transfer plate 2A. The low-temperature fluid flows in from the low-temperature inlet header 23, and flows out of the low-temperature outlet header 24 through the plurality of channels 25B. Such a flow of the low-temperature fluid occurs in a low-temperature channel layer corresponding to each of the low-temperature heat transfer plates 2B. Note that the low-temperature channel layer is formed of each of the channels 25B, the seventh cutout 28B, and the eighth cutout 29B of the low-temperature heat transfer plate 2B.

The high-temperature channel layers and the low-temperature channel layers are alternately stacked in the heat exchanger body 2. Therefore, heat is exchanged between the high-temperature fluid and the low-temperature fluid via the high-temperature heat transfer plate 2A and the low-temperature heat transfer plate 2B.

[Configuration of Printed Board 4]

As shown in FIG. 1, various integrated circuits 41, a connector 42 for connection with an external wire, a wireless module 43 that is a transmission device, a display device 44, and a group of electronic components such as a plurality of temperature sensors 45A, 45B, 45C, 45D are mounted on an upper surface 4a of the printed board 4 (hereinafter, referred to as "main surface"). Further, wiring patterns 46 that electrically connect the above-mentioned electronic components are provided in the main surface 4a of the printed board 4. For example, the wiring patterns 46 serve for connection between the plurality of temperature sensors 45A, 45B, 45C, 45D and the electromotive force processing circuit 411 (see FIG. 11) in the integrated circuits 41.

This printed board 4 is fixed with a plurality of fixing screws 47 while spacers 52 are sandwiched between the printed board 4 and the heat exchanger body 2. That is, screw insertion holes 47a that allow the fixing screws 47 to pass therethrough are provided in the printed board 4. Screw holes 51 that receive the fixing screws 47 passing through the screw insertion holes 47a are provided in the heat exchanger body 2.

The temperature sensors 45A, 45B, 45C, 45D are for measuring the temperatures of the high-temperature fluid flowing through the high-temperature inlet pipe 5A, the high-temperature fluid flowing through the high-temperature outlet pipe 5B, the low-temperature fluid flowing through the low-temperature inlet pipe 5C, and the low-temperature fluid flowing through the low-temperature outlet pipe 5D.

[Attachment Structure of Temperature Sensor]

Figure 7:
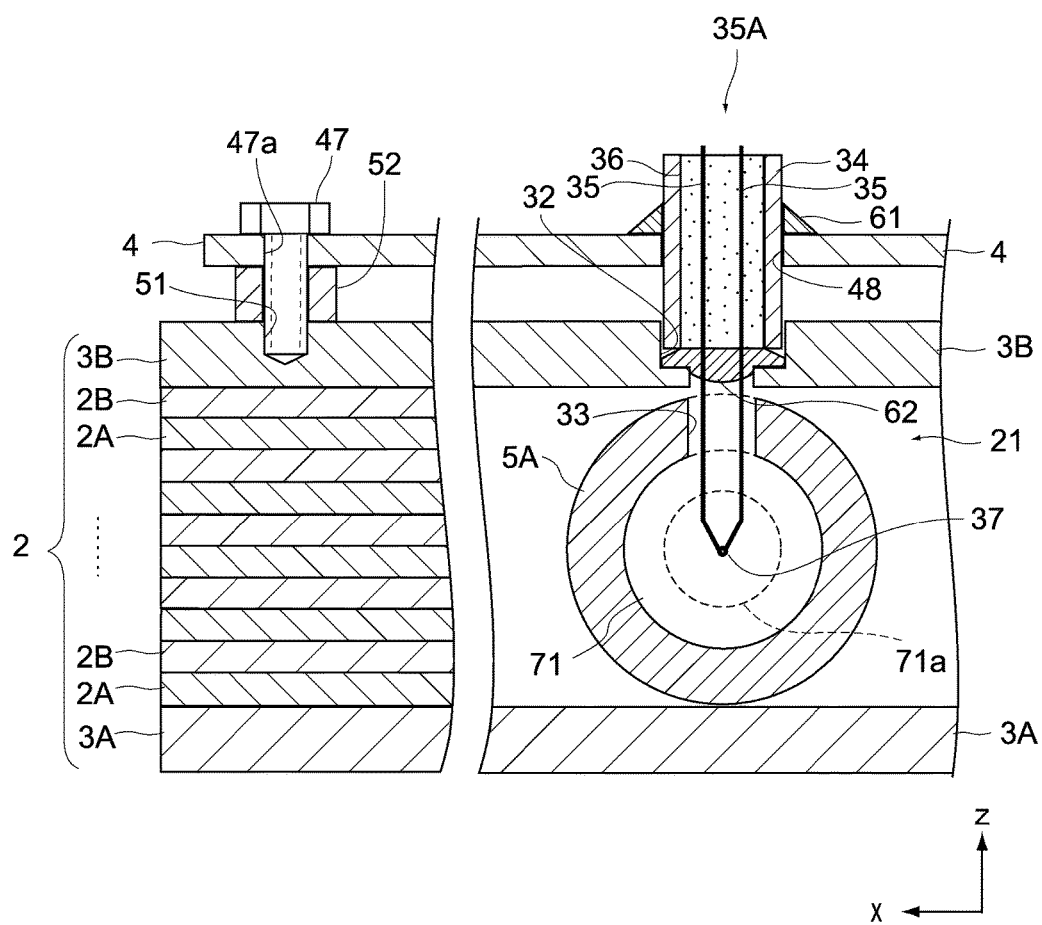
FIG. 7 A cross-sectional view taken along the line A-A in FIG. 1.
Figure 8:
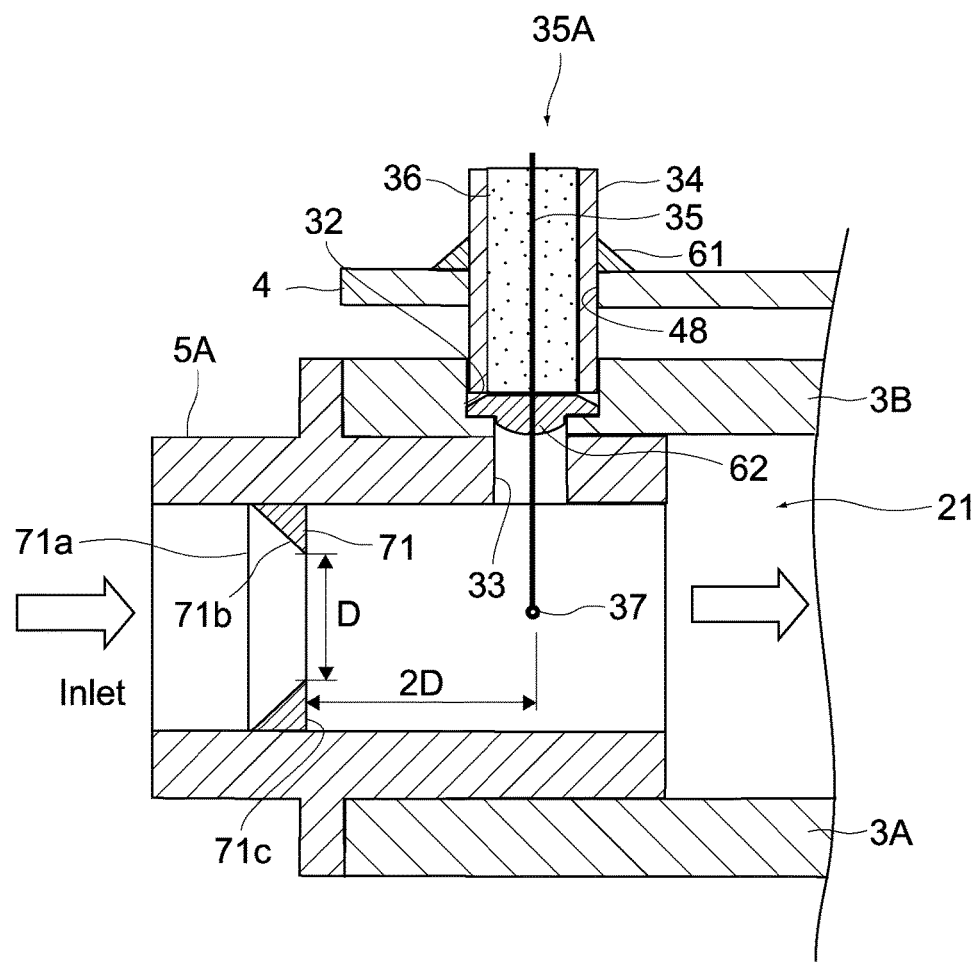
FIG. 8 A cross-sectional view taken along the line B-B in FIG. 1.

FIGS. 7 and 8 are cross-sectional views of the heat exchanger body 2, which are taken along the cutting line A-A and the cutting line B-B shown in FIG. 1, showing an attachment structure of the first temperature sensor 45A. FIG. 7 is an X-Z cross-sectional view as the attachment structure of the temperature sensor 45A is viewed in an axis direction of the high-temperature inlet pipe 5A (flow direction of fluid). FIG. 8 is a Y-Z cross-sectional view thereof. Attachment structures of the other temperature sensors 45B, 45C, 45D are similar to the attachment structure of the first temperature sensor 45A, and hence only the attachment structure of the first temperature sensor 45A will be described here. As shown in FIG. 1, the printed board 4 to which the temperature sensors 45A, 45B, 45C, 45D are attached are fixed to the upper surface of the heat exchanger body 2 with the fixing screws 47.

A hole 48 is provided in the printed board 4. The hole 48 is for inserting a thermocouple that is the first temperature sensor 45A. The hole 32 communicating with the hole 48 of the printed board 4 is provided in the low-temperature-side outer case plate 3B of the heat exchanger body 2. In addition, the hole 33 communicating with the hole 32 of the low-temperature-side outer case plate 3B is provided in a site of the high-temperature inlet pipe 5A inserted into the inlet of the heat exchanger body 2, the site being on the side of the low-temperature-side outer case plate 3B.

In each of the holes 48, 32 of the printed board 4 and the low-temperature-side outer case plate 3B, a metal protection pipe 34 made of, for example, stainless steel is arranged. The thermocouple wires 35, 35 of the first temperature sensor 45A within the metal protection pipe 34 are covered with electrical insulation/thermal insulation members 36. One having diameter of approximately 0.5 mm to 1 mm, for example, can be used as each of the thermocouple wires 35, 35 of the first temperature sensor 45A. It is desirably increased in durability with a ceramic thin film or the like. Temperature-measuring junctions 37 (sensing points of the temperature sensor), which are provided at leading ends of the thermocouple wires 35, 35 of the first temperature sensor 45A, are arranged to be in direct contact with a fluid flowing in the high-temperature inlet pipe 5A. It is desirable that the temperature-measuring junctions 37 have a spherical shape having a diameter of approximately 0.5 mm or 1 mm, for example, not to receive pressure from the fluid as much as possible.

A clearance between the hole 48 of the printed board 4 and the metal protection pipe 34 is closed by a seal material 61. Further, the hole 32 of the low-temperature-side outer case plate 3B is closed by a seal material from below.

Hereinabove, the attachment structure of the first temperature sensor 45A has been described. The attachment structures of the second temperature sensor 45B, the third temperature sensor 45C, and the fourth temperature sensor 45D are similar to the attachment structure of the first temperature sensor 45A. As described above, the temperature-measuring junctions 37 of the first temperature sensor 45A are held in direct contact with the high-temperature fluid flowing in the high-temperature inlet pipe 5A of the inlet of the heat exchanger body 2. In this manner, the temperature of the high-temperature fluid that flows in the heat exchanger body 2 can be directly measured. Similarly, the temperatures of the high-temperature fluid that flows out of the heat exchanger body 2, the low-temperature fluid that flows into the heat exchanger body 2, and the low-temperature fluid that flows out of the heat exchanger body 2 can be directly measured by the second temperature sensor 31B, the third temperature sensor 31C, and the fourth temperature sensor 31D, respectively.

However, the flow of the working fluid flowing within each of the outlet/inlet pipes 5A, 5B, 5C, 5D is reduced in velocity near the inner wall of each of the outlet/inlet pipes 5A, 5B, 5C, 5D, and a non-uniform temperature distribution is thus formed. Therefore, even when the temperature of the working fluid is directly measured, an accurate temperature cannot necessarily be obtained as the result of measurement.

In view of this, a flow adjustment ring is disposed within each of the outlet/inlet pipes 5A, 5B, 5C, 5D of the heat exchanger body 2. The flow adjustment ring is for forming a core region in which the velocity and the temperature of the working fluid becomes approximately constant. The temperature-measuring junctions of the temperature sensor are arranged in the core region formed in a downstream region of this flow adjustment ring.

As shown in FIGS. 7 and 8, a flow adjustment ring 71 is disposed within the high-temperature inlet pipe 5A. The flow adjustment ring 71 includes an aperture 71a coaxially with respect to the high-temperature inlet pipe 5A. A diameter D on an inlet side of this aperture 71a is equal to an inside diameter of the high-temperature inlet pipe 5A. The diameter D on an outlet side 71c is about two-thirds of the diameter D on the inlet side. Then, a portion between the inlet side and the outlet side 71c of the aperture 71a has a mortar-like taper surface shape. This structure is also applied to the low-temperature inlet pipe 5C connected to the inlet of the heat exchanger body 2, into which the low-temperature fluid flows.

Figure 9:
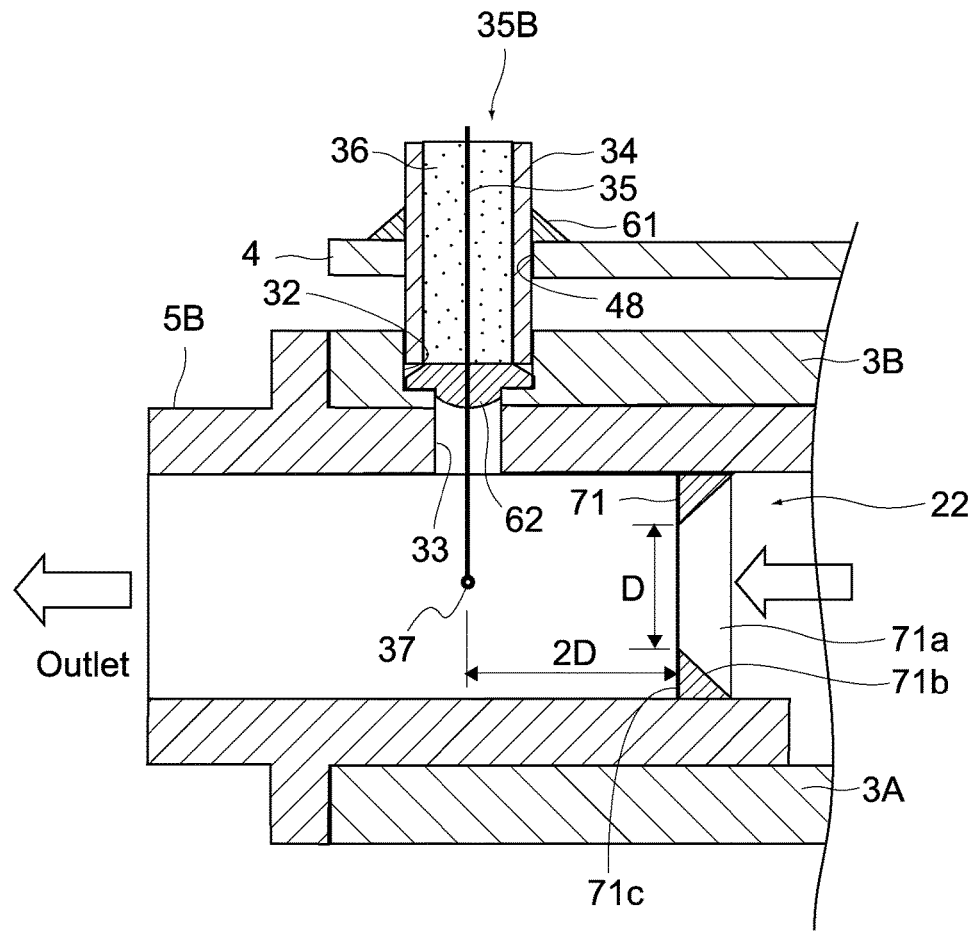
FIG. 9 A cross-sectional view taken along the line C-C in FIG. 1.

FIG. 9 is a Y-Z cross-sectional view taken along the cutting line C-C shown in FIG. 1, showing the high-temperature outlet pipe 5B connected to the outlet of the heat exchanger body 2, of which the high-temperature fluid flows out, and the flow adjustment ring 71.

As shown in the figure, the flow adjustment ring 71 is also disposed within the high-temperature outlet pipe 5B connected to the outlet of the heat exchanger body 2, of which the high-temperature fluid flows out.

This structure is also applied to the low-temperature outlet pipe 5D connected to the outlet of the heat exchanger body 2, of which the low-temperature fluid flows out.

Figure 10:
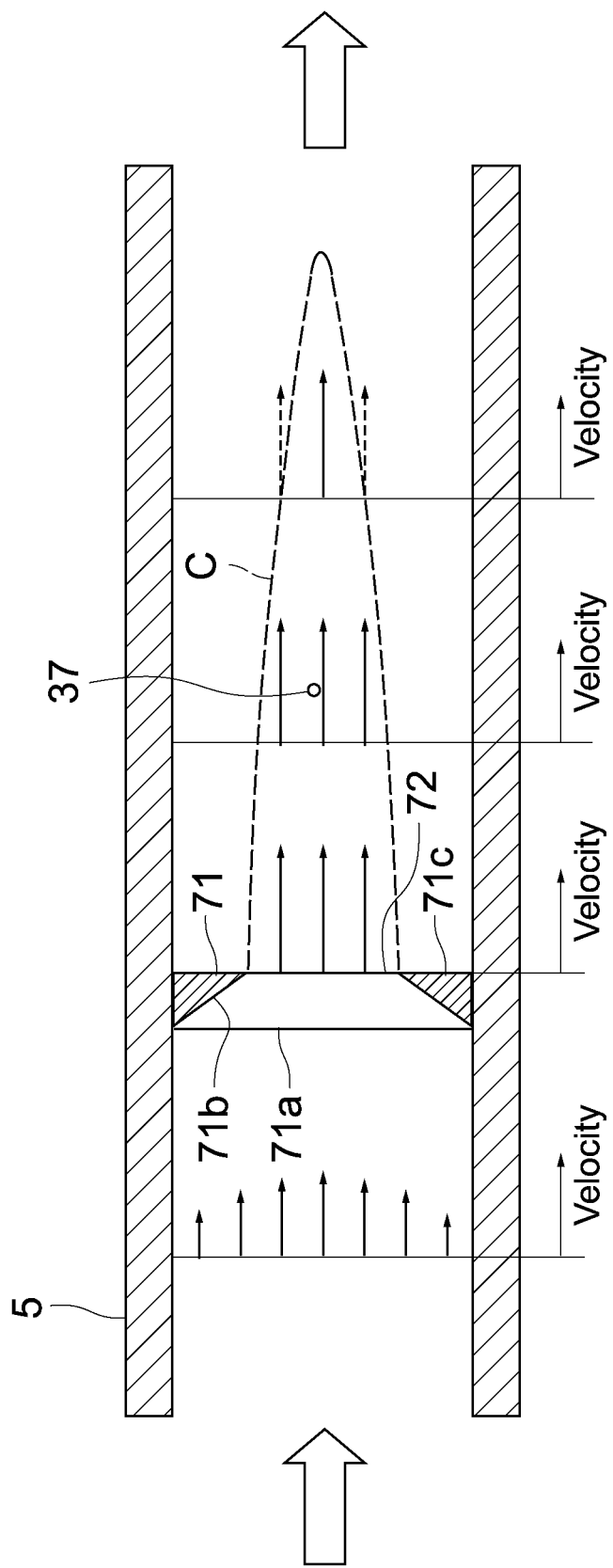
FIG. 10 A diagram showing a velocity distribution of a working fluid in an upstream region and a downstream region of a flow adjustment ring, regarding the microchannel heat exchanger of FIG. 1.

FIG. 10 is a diagram showing a velocity distribution of the working fluid in an upstream region and a downstream region of the flow adjustment ring 71. In a case where the flow adjustment ring 71 is provided in the inlet pipe, an outlet side 71c of the aperture 71a becomes a boundary 72 with the inlet of the heat exchanger body 2.

The working fluid flowing into each of the outlet/inlet pipes 5A, 5B, 5C, 5D from the outside or the heat exchanger body 2 is reduced in velocity near the inner wall of each of the outlet/inlet pipes 5A, 5B, 5C, 5D in the upstream region of the flow adjustment ring 71. As a result, a non-uniform velocity distribution occurs. Specifically, in this non-uniform velocity distribution, the velocity decreases as the distance from the center axis of each of the outlet/inlet pipes 5A, 5B, 5C, 5D increases. In the upstream region of the flow adjustment ring 71, the working fluid flowing near the inner wall of each of the outlet/inlet pipes 5A, 5B, 5C, 5D is guided in a direction to the center axis of each of the outlet/inlet pipes 5A, 5B, 5C, 5D by a taper surface 71b of the aperture 71a of the flow adjustment ring 71, and mixed into other flows passing near a center of the aperture 71a of the flow adjustment ring 71. As a result, a core region C is generated in the downstream region just behind the aperture 71a of the flow adjustment ring 71. In this core region C, the velocity of the working fluid is approximately constant and higher than an average velocity of the working fluid within the outlet/inlet pipe 5A, 5B, 5C, 5D in the upstream region of the flow adjustment ring 71. Assuming that the diameter on the inlet side of the flow adjustment ring 71 is D and the diameter on the outlet side is ⅔D as an example, the core region C is formed between the outlet side 71c of the aperture 71a of the flow adjustment ring 71 and a position spaced away from the outlet side 71c by 6D toward the downstream (approximately uniform temperature distribution region can be formed both radially and axially, and hence mounting of the thermocouple is facilitated and also fluid temperature measurement becomes correct). There are a velocity boundary layer and a temperature boundary layer outside the core region C. In this core region C, the velocity of the working fluid is approximately constant and also temperature distribution is approximately uniform. Therefore, by arranging the temperature-measuring junctions 37 of the temperature sensor in this core region C, the temperature of the working fluid can be correctly measured without being influenced by the velocity boundary layer and the temperature boundary layer.

In this embodiment, as shown in FIGS. 8 and 9, the temperature sensors 45A, 45B are arranged in such a manner that the temperature-measuring junctions 37 are located at positions spaced away from the position of the outlet side 71c of the aperture 71a of the flow adjustment ring 71 by a distance of 2D on the downstream side. With this, the temperature of the working fluid that flows in or flows out of the inlet or the outlet of the heat exchanger body 2 can be correctly measured without being influenced by the velocity boundary layer and the temperature boundary layer. With this, calculation of the quantity of heat of heat exchange, control of the flowing-out working fluid to a desired temperature, and the like can be more correctly performed.

Note that, regarding the shape of the aperture 71a of the flow adjustment ring 71, the taper surface 71b of the aperture 71a may be a constant tilt surface in a cross-section, though the present invention is not limited thereto. It is only necessary to gradually narrow the area of the aperture 71a, and hence it may be a sine-curve surface, a paraboloid surface, or hyperboloid surface.

[Functional Configurations of Various Electronic Components Mounted on Printed Board 4]

Figure 11:
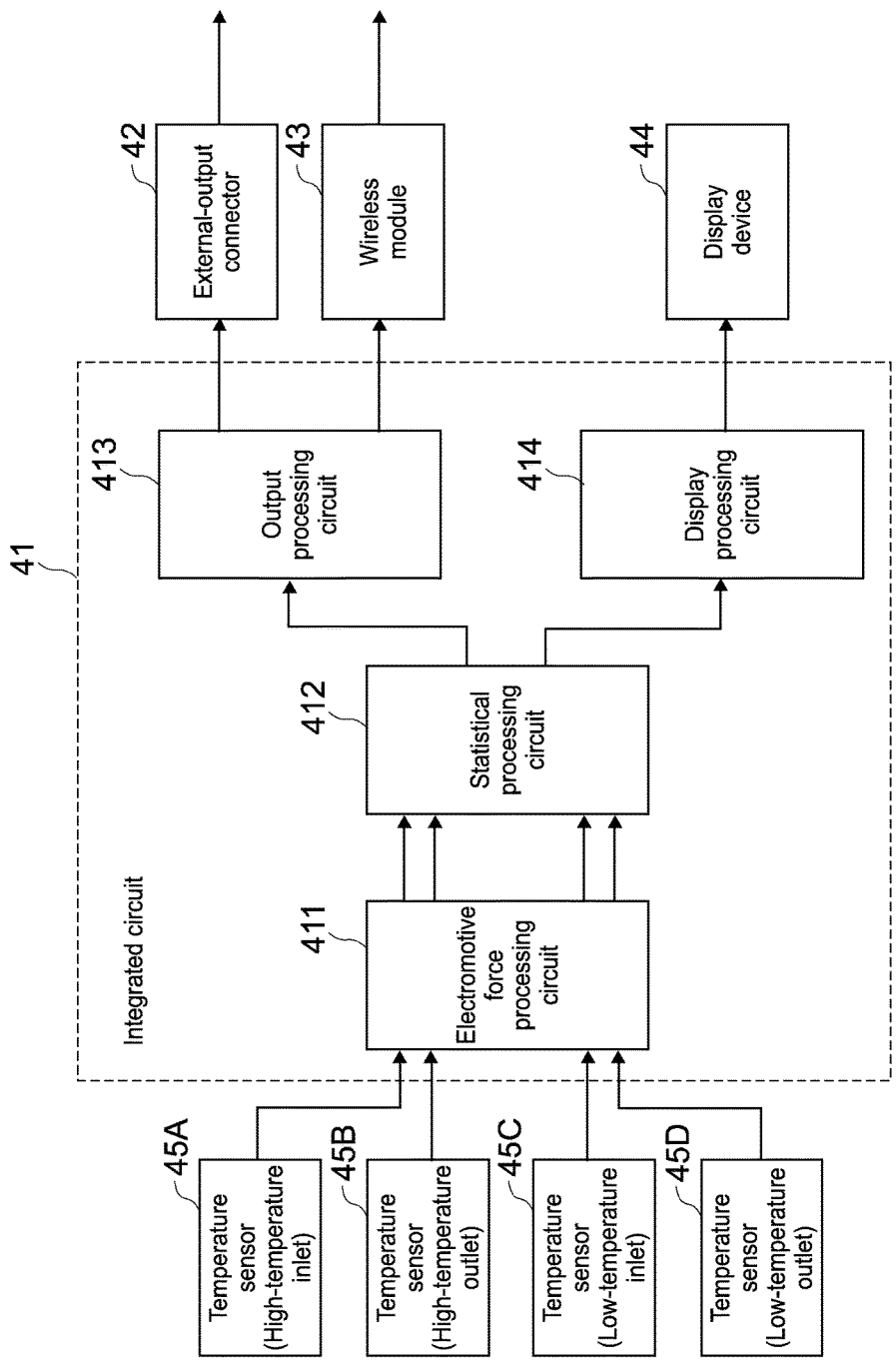
FIG. 11 A block diagram showing configurations including an electrical connection relationship between electronic components mounted on a printed board of the microchannel heat exchanger of FIG. 1.

FIG. 11 is a diagram showing configurations including an electrical connection relationship between electronic components mounted on the printed board 4 as functional blocks.

As shown in the figure, this printed board 4 includes the above-mentioned four temperature sensors 45A, 45B, 45C, 45D, an electromotive force processing circuit 411, a statistical processing circuit 412, an output processing circuit 413, a display processing circuit 414, a connector 42 for external connection, the wireless module 43, and the display device 44. Here, the electromotive force processing circuit 411, the statistical processing circuit 412, the output processing circuit 413, and the display processing circuit 414 are included in the one or more integrated circuits 41. Alternatively, each of them may be separately included in each of the integrated circuits 41.

The electromotive force processing circuit 411 generates temperature data corresponding to an output voltage between the thermocouple wires 35, 35 of each of the temperature sensors 45A, 45B, 45C, 45D. The electromotive force processing circuit 411 supplies the temperature data to the statistical processing circuit 412.

The statistical processing circuit 412 performs various types of statistical processing on the temperature data of each temperature sensor, which is supplied by the electromotive force processing circuit 411. The statistical processing circuit 412 calculates a mean value, a maximum value, a minimum value, and the like of the temperature data at each measurement time, for example. Alternatively, the statistical processing circuit 412 calculates a mean value, a maximum value, a minimum value, and the like under a condition, for example, in a particular time zone such as morning. The statistical processing circuit 412 can include a memory device and store the result of calculation.

The output processing circuit 413 is capable of outputting the result of statistical processing obtained by the statistical processing circuit 412 to the external device through the external-output connector 42 and sending the result of statistical processing to the external device by the use of the wireless module 43.

The display processing circuit 414 generates data to be displayed on the basis of the result of statistical processing, which is obtained by the statistical processing circuit 412, and outputs the data to be displayed to the display device 44.

The display device 44 includes, for example, a liquid-crystal panel and the like. The display device 44 is provided with a display screen along the main surface 4a of the printed board 4. The display device 44 displays the display data supplied by the display processing circuit 414 on the display screen.

FIG. 12 shows an example when the temperatures of the working fluids of the heat exchanger body 2 at the inlet for the high-temperature fluid, the outlet for the high-temperature fluid, the inlet for the low-temperature fluid, and the outlet for the low-temperature fluid, which are calculated at the same point of time, are displayed on the display screen of the display device 44. It can be seen that each temperature can be visually checked on the display screen of the display device 44 mounted on the printed board 4 of the microchannel heat exchanger 1.

As described above, in accordance with this embodiment, the printed board 4 installing the plurality of temperature sensors 45A, 45B, 45C, 45D in advance is mounted on the upper surface of the heat exchanger body 2. Thus, it is possible to place the plurality of temperature sensors 45A, 45B, 45C, 45D in the heat exchanger body 2 at the same time and easily carry out the work of attaching the temperature sensors. Further, the integrated circuits 41 including the circuit that processes data measured by the temperature sensors 45A, 45B, 45C, 45D is installed in the printed board 4. Thus, it is possible to easily connect the temperature sensors 45A, 45B, 45C, 45D and the integrated circuits 41 through the wiring patterns formed in the printed board 4. In addition, the display device 44 for displaying temperature data measured by the temperature sensors 45A, 45B, 45C, 45D is also installed in the printed board 4. Thus, it becomes unnecessary to connect an external monitor for visually checking the temperature data. In addition, the connector 42 for external connection and the wireless module 43 are also installed in the printed board 4. Thus, it is possible to send the temperature data to the external device at all times.

Note that, the temperature sensors 45A, 45B, 45C, 45D are installed in the printed board 4 in advance in this embodiment, though the present technology is not limited thereto. After the temperature sensors 45A, 45B, 45C, 45D are attached to the heat exchanger body 2, the printed board 4 may be mounted on the heat exchanger body 2 and the temperature sensors 45A, 45B, 45C, 45D may be installed in the printed board 4. Further, the technology of mounting the printed board 4 on the heat exchanger body 2 as in the present technology is advantageous for a small heat exchanger such as a microchannel heat exchanger in which the distance between the temperature sensors 45A, 45B, 45C, 45D is short and the printed board 4 can be downsized.

Further, although the printed board 4 is fixed to the heat exchanger body 2 while sandwiching the spacers 52 therebetween in this example, it may be fixed while sandwiching a heat insulation sheet or an elastic cushion material instead of the spacers 52. Alternatively, if it is unnecessary, the printed board 4 may be directly fixed to the heat exchanger body 2.

Other Embodiments

Next, a second embodiment will be described. Note that a microchannel heat exchanger of this embodiment has the same configurations as the microchannel heat exchanger of the first embodiment, and hence descriptions of the configurations will be omitted.

When heat is exchanged between water and a coolant within a microchannel heat exchanger to thereby generate hot water in a hot water supply operation, the heat exchanger outside the room is covered with frost. A reverse defrosting operation is performed for melting this frost. In the reverse defrosting operation, the flow of the coolant in the refrigeration cycle becomes reverse of that of the hot water supply operation.

Therefore, the coolant flowing into the microchannel heat exchanger in the defrosting operation has a low temperature. With this, water flowing into the microchannel heat exchanger is cooled due to the low-temperature coolant, and may become ice. There is a fear that the ice may break the channel for water.

Figure 13:
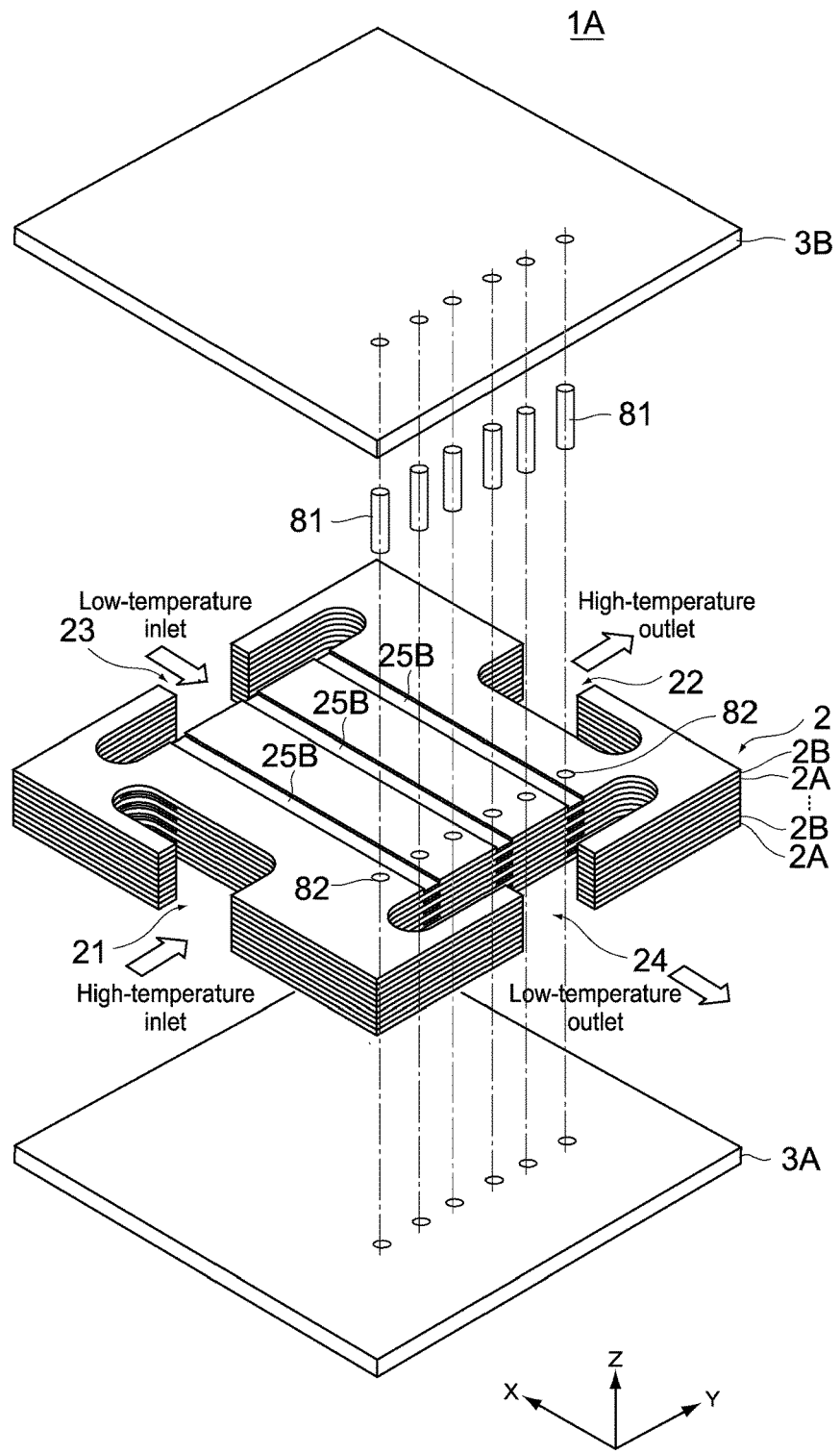
FIG. 13 A partially exploded perspective view showing configurations of a main part of a second microchannel heat exchanger of the present invention.

In view of this, as shown in FIG. 13, in a microchannel heat exchanger 1A of this embodiment, heaters 81 connected to the printed board 4 are disposed in holes 82 provided near water channels 25B in a manner that similar to that of the temperature sensors. The temperature sensors 45C, 45D are provided within channels for water (channels 25B forming channels for low-temperature fluid), and hence the temperature (0° C.) at which water in the channels 25B becomes ice can be detected. Therefore, water flowing through the channels 25B can be heated and prevented from being frozen by actuating the heaters 81 when the values of the temperature sensor 45C, 45D become equal to or lower than 0° C. (temperature at which water becomes ice).

In addition, the present technology is not limited to the above-mentioned embodiments, and various changes can be made without departing from the gist of the present technology as a matter of course.

REFERENCE SIGNS LIST

1 . . . microchannel heat exchanger
2 . . . heat exchanger body
2A . . . high-temperature heat transfer plate
2B . . . low-temperature heat transfer plate
3A . . . high-temperature-side outer case plate
3B . . . low-temperature-side outer case plate
4 . . . printed board
21 . . . high-temperature inlet header
22 . . . high-temperature outlet header
23 . . . low-temperature inlet header
24 . . . low-temperature outlet header
41 . . . integrated circuit
42 . . . external-output connector
43 . . . wireless module
44 . . . display device
45A . . . first temperature sensor
45B . . . second temperature sensor
45C . . . third temperature sensor
45D . . . fourth temperature sensor
46 . . . wiring pattern

The invention claimed is:

1. A microchannel heat exchanger, comprising:
a microchannel heat exchanger body including a channel layer stack formed in such a manner that a plurality of high-temperature channel layers provided with a channel for a high-temperature fluid and a plurality of low-temperature channel layers provided with a channel for a low-temperature fluid are alternately stacked, an inlet and an outlet for the high-temperature fluid, and an inlet and an outlet for the low-temperature fluid; and
a printed circuit board that is fixed to a surface of the microchannel heat exchanger body, and that has installed thereon at least a plurality of temperature sensors that are mounted on a surface of the printed circuit board and inserted in a stacking direction of the heat exchanger body in such a manner that each sensing point of the plurality of temperature sensors is arranged to be in direct contact with fluid near each of the inlet and the outlet for the high-temperature fluid and the inlet and the outlet for the low-temperature fluid.

2. The microchannel heat exchanger according to claim 1, characterized in that
a display device that displays temperature data is installed in the printed circuit board.

3. The microchannel heat exchanger according to claim 1, wherein
a transmission device that wiredly or wirelessly sends temperature data to an external device is installed in the printed circuit board.

4. The microchannel heat exchanger according to claim 1, further comprising:
a heater in the printed circuit board, the heater being arranged near the channel for the low-temperature fluid of the microchannel heat exchanger body.

5. The microchannel heat exchanger according to claim 1, further comprising:
a flow adjustment ring disposed near each of the inlet and the outlet of the high-temperature fluid and the inlet and the outlet of the low-temperature fluid so that the temperature of fluid that flows in or flows out of the inlet or the outlet of the heat exchanger body can be correctly measured without being influenced by a velocity boundary layer and a temperature boundary layer.

* * * * *